United States Patent [19]

Fisher et al.

[11] Patent Number: 5,013,439
[45] Date of Patent: May 7, 1991

[54] MICROPOROUS MEMBRANES HAVING INCREASED PORE DENSITIES AND PROCESS FOR MAKING THE SAME

[75] Inventors: Harold M. Fisher; Daniel E. Leone; James J. Lowery, all of Charlotte, N.C.

[73] Assignee: Hoechst Celanese Corporation, Somerville, N.J.

[21] Appl. No.: 433,450

[22] Filed: Nov. 9, 1989

Related U.S. Application Data

[63] Continuation of Ser. No. 193,327, May 12, 1988, abandoned.

[51] Int. Cl.$^5$ ............................................. B01J 71/26
[52] U.S. Cl. ......................... 210/500.23; 210/500.36; 264/156
[58] Field of Search ............ 210/500.36, 500.23; 55/16, 156; 264/196.1, 156

[56] References Cited

U.S. PATENT DOCUMENTS

| | | | |
|---|---|---|---|
| 3,426,754 | 2/1969 | Bierenbaum | 128/156 |
| 3,679,538 | 7/1972 | Druin et al. | 161/159 |
| 3,801,404 | 4/1974 | Druin et al. | 156/229 |
| 3,801,692 | 4/1974 | Zimmerman | 264/210 R |
| 3,839,240 | 10/1974 | Zimmerman | 260/2.5 HA |
| 3,839,924 | 10/1974 | Zimmerman | 260/2.5 HA |
| 3,843,761 | 10/1974 | Bierenbaum et al. | 264/210 R |
| 3,880,966 | 4/1975 | Zimmerman et al. | 264/156 X |
| 4,138,459 | 2/1979 | Brazinsky et al. | 264/154 |
| 4,255,376 | 3/1981 | Soehngen | 264/145 |
| 4,257,997 | 3/1981 | Soehngen et al. | 264/145 |
| 4,405,688 | 9/1983 | Lowery et al. | 428/398 |
| 4,541,981 | 9/1985 | Lowery et al. | 264/176.1 X |
| 4,664,681 | 5/1987 | Anazawa et al. | 55/158 |
| 4,696,748 | 9/1987 | Nitadori et al. | 210/500.23 X |

FOREIGN PATENT DOCUMENTS

| | | |
|---|---|---|
| 0057328 | 12/1981 | European Pat. Off. |
| 0147849 | 12/1984 | European Pat. Off. |
| 0210059 | 7/1986 | European Pat. Off. |
| 2041821 | 2/1980 | United Kingdom |

OTHER PUBLICATIONS

S. Brunauer et al., Journal of American Chemical Society, vol. 60, p. 309 (1938).

F. M. Nelson et al. Analytical Chemistry, vol. 30, p. 1387 (1958).

"Application of Mercury Penetration to Materials Analysis", Clyde Orr, Jr., Powder Technology, 3, pp. 117-123 (1969/70).

Primary Examiner—Frank Spear
Attorney, Agent, or Firm—Kenneth A. Genoni; Jay M. Brown; Bryan H. Davidson

[57] ABSTRACT

Disclosed are a process for forming an open-celled microporous membrane (e.g., in film or fiber form) and a novel microporous membrane formed thereby. The process generally includes sequential cold and hot stretching operations, whereby the cold stretching operation is preferably accomplished in a plurality of discrete cold stretching steps. In this regard, the total cold stretch extension is of greater than about 30 percent, and advantageously greater than about 40 percent based upon the initial unstretched length of the nonporous precursor, with this total cold stretch ratio being distributed among a plurality of discrete cold stretching steps. The novel membranes of this invention are characterized by decreased pore size and increased pore densities. For example, the membranes of this invention will have an average pore radius as determined by mercury porosimetry of less than about 0.040 micron. The membranes of this invention, moreover, exhibit a distinctive "bluish" color hue (i.e., a Macbeth Coloreye TM b* value of less than about −10 as determined by placing a single ply sample of the membrane against a black background).

14 Claims, 5 Drawing Sheets

MICROPOROUS MEMBRANES HAVING INCREASED PORE DENSITIES AND PROCESS FOR MAKING THE SAME

This is a continuation of application Ser. No. 07/193,327, filed May 12, 1988, now abandoned.

FIELD OF THE INVENTION

The present invention broadly relates to open-celled microporous membranes (e.g., in film or hollow fiber form) and to processes of making the same. The microporous membranes of the invention are characterized by increased pore densities and decreased pore sizes as compared to prior art microporous membranes of similar physical geometry. The membranes of the invention are prepared by sequential uniaxial cold and hot stretching (under conditions to be defined below) whereby the total cold stretch extension is significantly greater as compared to conventional membrane processing techniques, and is preferably accomplished in a series of discrete cold stretching steps.

BACKGROUND AND SUMMARY OF THE INVENTION

Membranes which possess a microporous, open-celled structure are not new. For example, methods of making microporous membranes have been proposed whereby a crystalline elastic starting film is drawn or stretched at ambient temperatures (i.e., so-called "cold drawing") in an amount of about 10 to about 300 percent of the starting film's original length, with subsequent stabilization by heat setting of the drawn film under tension such that the film is not free to shrink or can shrink only to a limited extent. An example of such a "cold drawing" process is U.S. Pat. No. 3,426,754 issued to H. S. Bierenbaum et al on Feb. 11, 1969.

Another technique employed in the art of making microporous membranes is the so-called "solvent stretch" process as exemplified by U.S. Pat. Nos. 4,255,376 issued to J. W. Soehngen on Mar. 10, 1981 and 4,257,997 issued to J. W. Soehngen et al on Mar. 24, 1981. Briefly, the solvent stretch process involves preparing microporous films from a two-component precursor film (i.e., one having an amorphous component and a crystalline component). The precursor film is brought into contact with a swelling agent and longitudinally stretched while still in contact with the swelling agent. Subsequently, the swelling agent is removed while the film is maintained in its longitudinally stretched condition to render the film microporous.

Corona discharge treatments have also been employed in the past to render polymeric films microporous as exemplified by U.S. Pat. No. 3,880,966 issued to D. Zimmerman et al on Apr. 29, 1975. In this conventional process, polymeric films are subjected to a corona discharge treatment so as to render the film permeable. The films are then rendered microporous by stretching and heat setting.

Other processes for producing open-celled microporous membranes using sequential "cold" and "hot" stretching steps have also been proposed as exemplified by U.S. Pat. Nos. 3,679,538 issued to M. L. Druin et al on July 25, 1972 and 3,801,692 issued to D. Zimmerman on Apr. 2, 1984, the entire content of these prior-issued patents being expressly incorporated herein by reference. Generally these processes include the steps of cold stretching a non-porous, crystalline, elastic film, thereafter hot stretching the cold stretched film to render it microporous, and finally heat setting the microporous film.

Special techniques have also been proposed for the sequential "cold" and "hot" stretching process. For example, in U.S. Pat. No. 3,843,761 issued to H. S. Bierenbaum et al on Oct. 22, 1978 (the entire content of which is expressly incorporated herein by reference), a process is disclosed whereby an annealed film is initially cold stretched and then subsequently subjected to multiple hot stretching steps so as to render a variety of polymeric films microporous. According to U.S. Pat. No. 4,138,459, another technique is disclosed whereby polymeric films are rendered microporous by subjecting an annealed film to cold stretching, hot stretching, and heat relaxing steps.

Pore density is an important physical attribute of a microporous membrane since it directly determines the gas flux of the membrane (i.e., permeability). That is, the greater density of the pores in the microporous membrane, the greater the ability of the film to allow a volume of gas to flow through a fixed surface area of the membrane in a fixed period of time. Such permeabilities are usually expressed in terms of "Gurley Values" (sometimes also referred to as "Gurley Seconds"), which is the time required for 10 cm$^3$ of air to pass through 1 in$^2$ of membrane from one exterior surface to an opposite exterior surface thereof when a pressure differential of 12.2 inches of water is applied across the membrane. Since permeability is a measure of the ease of mass transfer across the membrane, lower Gurley Values correspond to lower mass transfer times and hence correspond to higher permeabilities and a concomitant greater ease of mass transfer.

The capability of membranes to have a greater ease of mass transfer thereacross is important in many end use applications, such as filter media, solute extraction membranes, blood oxygenation membranes, battery separators, etcetera. However, since the pore density of microporous membranes (and its resulting permeability) is a function of pore size, in order to increase the pore density of a microporous membrane, the pore size must be correspondingly reduced. While the prior art processes noted above do permit microporous membranes to be produced which have satisfactory permeability properties, there still exists a continual need for improvements.

According to the present invention, novel open-celled microporous membranes are provided having increased pore densities and correspondingly reduced pore sizes as compared to conventional microporous membranes. Surprisingly, the novel membranes of the present invention are produced by subjecting a membrane precursor to an increased cold stretch which is preferably accomplished in multiple discrete uniaxial cold stretching steps prior to hot stretching. That is, the total amount of cold stretching of the membrane precursor is increased as compared to the cold stretching employed in conventional microporous membrane processes. And, this increased cold stretching is preferably distributed over multiple discrete cold stretching steps prior to hot stretching. Advantageously, the total cold stretch employed according to the present invention elongates the membrane precursor greater than about 30%, and more advantageously greater than about 40%, based upon its initial length prior to cold stretching, this total cold stretch preferably being distributed over two or more (preferably two to four) discrete sequential cold stretching steps.

The membranes of the invention will also advantageously exhibit a pore morphology characteristic of conventional membranes obtained by sequential uniaxial cold and hot stretching techniques. That is, the membranes of this invention will have a plurality of elongated, non-porous, interconnecting surface regions which have their axes of elongation substantially parallel to each other, and substantially normal or perpendicular to the direction in which the membrane is stretched. Substantially alternating with and defined by the non-porous surface regions is a plurality of elongated, porous surface regions which contain a plurality of parallel fibrils. The fibrils are connected at each of their ends to the non-porous regions and are substantially perpendicular to them. A dense plurality of pores is thus defined between these fibrils.

The membranes of the present invention are open-celled and are particularly characterized by a reduced bulk density as compared to a corresponding membrane precursor having a nonopen-celled structure. Moreover, the membranes of this invention exhibit permeabilities (as determined by a gas flux of less than about 22 Gurley seconds), and an average pore density of greater than about 75 pores per square micron of membrane surface. The pores will typically have an average length as measured in the direction of the longitudinal stretching of less than about 0.10 micron (advantageously between about 0.05 to 0.09 micron), an average pore breadth as measured in a direction perpendicular to the longitudinal stretching of less than about 0.035 micron (advantageously between about 0.024 to 0.035 micron), an average pore surface area of less than about $2.5 \times 10^{-3}$ square micron (advantageously between about $0.9 \times 10^{-3}$ to $2.5 \times 10^{-3}$ square micron), an average pore radius as determined by mercury porosimetry of less than about 0.040 micron (advantageously between about 0.0365 to 0.040 micron), and a specific surface area of greater than about 45 m²/g (i.e., as determined by BET analysis using a Quantasorb ™ apparatus manufactured by the Quantachrome Corporation—see also, S. Brunauer et al, Journal of American Chemical Society, vol. 60, pg. 309 (1938); and F. M. Nelson et al, Analytical Chemistry, vol. 30, pg. 1387 (1958), the entire content of each of these articles being expressly incorporated hereinto by reference, for a further discussion of BET analysis).

Moreover, the membranes of the present invention are translucent and exhibit a characteristic "bluish" color hue. Specifically, the membranes of this invention exhibit a b* value of less than $-10$, and more specifically between about $-11$ to about $-14$ when a single ply membrane sample is analyzed in a Macbeth Coloreye ™ apparatus against a black background. The reasons for this "bluish" color hue are not fully understood at this time. However, without wishing to be bound to any particular theory, it is surmised that it is caused by the increased pore density and decreased pore size which apparently cause different diffusion and scattering of light in the visible spectrum as compared to conventional opaque membranes of similar geometry. This different scattering of light thus apparently translates into a visibly perceptible bluish color hue being imparted to the membranes of this invention.

The microporous membranes of the invention may be produced in film or fiber (e.g., hollow fiber) form and used in their as-produced form or further configured so as to suit a particular end use application in which it may be employed. For example, the membranes of the present invention may initially be in a hollow fiber form and then subsequently sliced longitudinally so as to then be in the form of a film. Thus, although reference has been, and will hereinafter be made to the present invention being embodied in the form of a film, this is merely for ease of explanation and should be considered as being equally applicable to hollow fiber or other physical membrane forms.

Other aspects and advantages of this invention will become more clear after careful consideration is given to the following detailed description of the preferred exemplary embodiments.

BRIEF DESCRIPTION OF THE DRAWINGS

Further understanding of this invention will be obtained with reference to the accompanying FIGURES, wherein.

DETAILED DESCRIPTION OF THE INVENTION

The starting material from which the microporous membranes of this invention are produced include polymers of a type capable of developing a significant degree of crystallinity, as contrasted with more conventional or "classical" elastic materials such as the natural and synthetic rubbers which are substantially amorphous in their unstretched or tensionless state. Thus, the polymers from which the starting films employed in this invention may be employed will typically have a crystallinity of at least 20 percent, preferably at least 30 percent, and most preferably at least 50 percent. Moreover, elastic films formed from such a polymer will exhibit an elastic recovery at zero recovery time when subjected to a standard strain (extension) of 50 percent at 25° C. and 65 percent relative humidity of at least about 40 percent, preferably at least about 50 percent, and most preferably at least about 80 percent.

A significant group of polymers, i.e., synthetic resinous materials, to which this invention may be applied are the olefinic polymers, e.g., polyethylene, polypropylene, as well as copolymers of ethylene and propylene with each other or with a minor amount of other olefins. For example, a film-forming homopolymer of polypropylene may be employed. When propylene homopolymers are contemplated, it is preferred to employ an isotactic polypropylene having a percent crystallinity as indicated above, a weight average molecular weight ranging from about 100,000 to 750,000, and preferably about 200,000 to 500,000 and a melt index from about 0.1 to about 65, and preferably about 0.5 to 30, so as to give a final film product having the requisite physical properties.

Preferably, the starting films which may be employed in this invention are produced according to the well known blown film method. Briefly, the blown film method contemplates melt extruding the polymer through a circular die slot (dimensioned between about 10 to 200 mils) to form a tubular film having an initial diameter $D_1$ (and a thickness between 10 to 200 mils corresponding to the slot dimension). Air enters the system through an inlet into the interior of the tubular film and has the effect of "blowing up" the diameter of the tubular film to a diameter $D_2$. An air ring (or other suitable equivalent means) may be employed to direct quench air about the exterior of the extruded tubular film, while a cooling mandrel may be used to cool the interior of the tubular film. After a short distance (during which the film is allowed to completely cool and harden), the tubular film is collapsed and wound up on a take-up roll.

Another method which may be employed to produce the starting films of the invention is the slit die extrusion method. In this method, a melt of the polymer is extruded through a linear slot (dimensioned between about 10 to 200 mils) in a die so as to form a film and this extruded film is drawn via a suitable take-up or casting roll.

In either method, the drawdown ratio, or more simply, the draw ratio, which is defined as the ratio of the thickness of the extruded film (which is equivalent to the slot opening in the die) to the final thickness of the film is preferably in the range of between about 20:1 to 200:1. The draw ratio when spoken of in relation to slit die extrusion denotes the ratio of the film wind-up speed to the speed of the film issuing from the extrusion die. When using the blown film method, the ratio of the blown film to the unblown film, or more simply the $D_2/D_1$ ratio, is in the range of between about 0.5:1 to 6.0:1, and more preferably 1.0:1 to about 2.5:1. The take-up speed when using the blown film method is preferably in the range of between about 10 to about 1,000 linear feet of film per minute. In either method, the melt temperature for extrusion is preferably in the range of between about 10° C. above the melting point of the polymer to about 100° C. above the melting point of the polymer.

Independent of the extrusion method employed to form the elastic starting films employed in the present invention, the extruded film is preferably heat treated or annealed in order to improve crystal structure. The annealing step increases the size of the crystallites and removes imperfections therein. As a general rule, annealing is carried out at a temperature in the range of between about 5° C. to 100° C. below the melting point of the polymer for a period of a few seconds to several hours, e.g., 5 seconds to 24 hours, and more preferably from about 30 seconds to 2 hours. In the preferred embodiment in which polypropylene is employed, the preferred annealing temperature is in the range of between about 100° C. and 155° C., for example.

A preferred method of annealing the elastic film employed in the instant invention is to place the extruded film in a tensioned or tensionless state in an oven at the desired temperature for a residence time as mentioned above, e.g., preferably for a time between 30 seconds to 2 hours.

As was previously mentioned, the novel microporous membranes of this invention may also be in the form of hollow fibers. In this regard, the starting hollow fibers employed in this invention may advantageously be made using the "up-spinning" technique disclosed in U.S. Pat. Nos. 4,405,688 and 4,451,981, each in the name of James J. Lowery et al, and each being expressly incorporated hereinto by reference. Briefly, non-porous precursor hollow fibers are produced according to the techniques disclosed in these prior patents by melt spinning the precursor fibers in a substantially vertically upward direction (i.e., up-spinning), and then spin orienting the thus melt spun hollow precursor fibers while subjecting them to a symmetrical quenching step using a hollow annular structure surrounding the precursor fiber which has one or more openings on its inner surface that distribute the quenching medium against the precursor fiber in a substantially uniform manner. The thus formed hollow precursor fiber may then be heat annealed in a manner similar to the film annealing procedure discussed previously. That is, annealing may be conducted by subjecting the non-porous precursor hollow fiber to a temperature of between about 5° C. to 100° C. for a time period of at least a few seconds (e.g., from a few seconds up to about 24 hours, preferably between about 30 minutes to about 2 hours).

Figure 1:
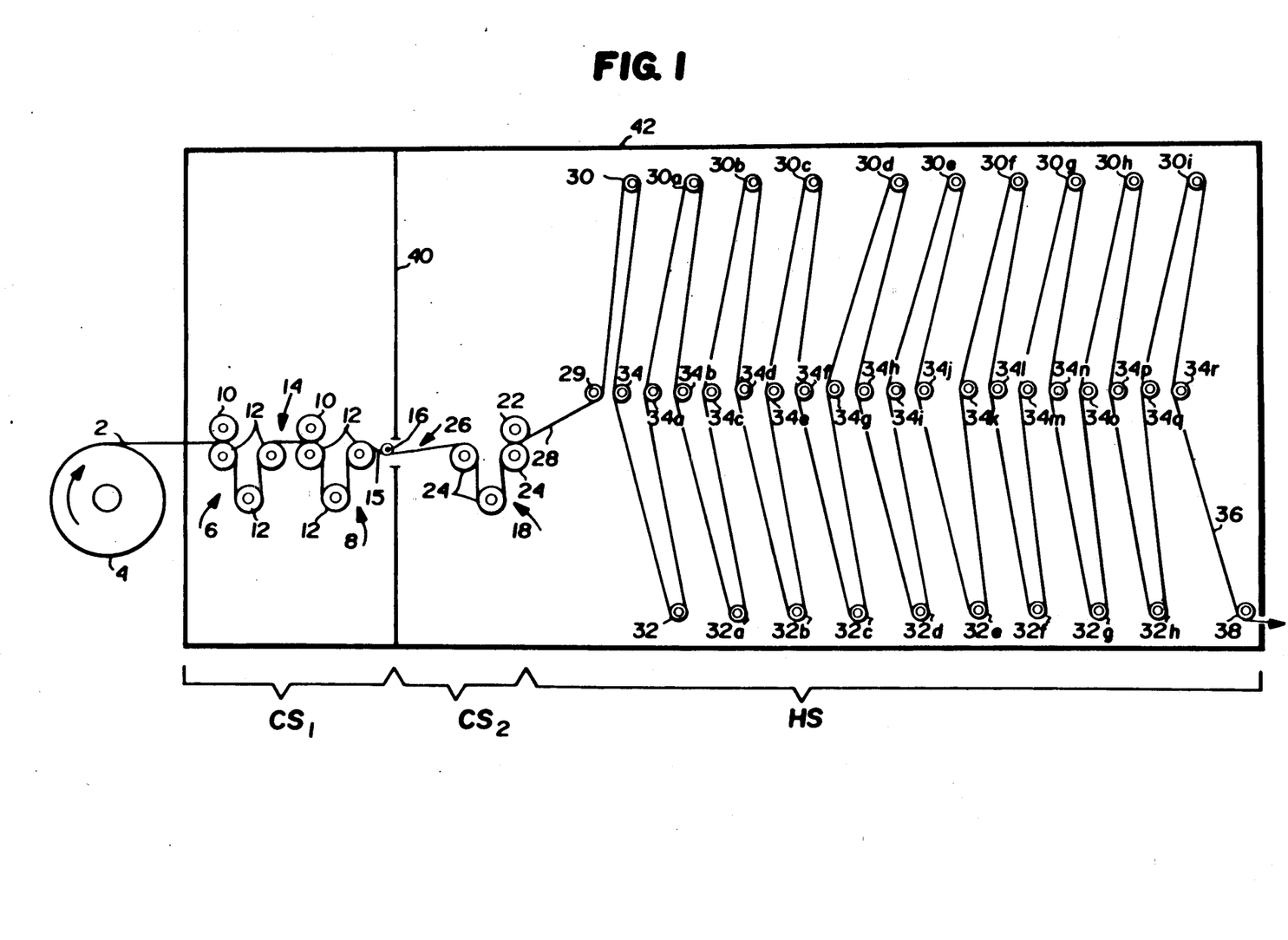
FIG. 1 is a schematic view of a preferred apparatus to mechanically produce microporous membranes according to the present invention.

The non-porous precursor film or fiber (which will simply be referred to hereinafter as a film for ease of description) is now ready to be rendered microporous as will be discussed below with reference to accompanying FIG. 1 which schematically depicts a presently preferred embodiment of this invention.

As is seen, a non-porous, elastic film 2 (which preferably has been heat annealed as discussed previously) is unrolled from a supply roll 4 into a first cold stretching zone designated generally as $CS_1$. The cold stretch zone $CS_1$ is generally comprised of longitudinally spaced sets of cold stretch rolls 6 and 8, respectively, each such set being composed of a nip roll 10 and a triad arrangement of stretching rolls 12. The stretching rolls 12 of roll set 6 are driven by any suitable drive means (not shown) at a peripheral speed $S_1$ which is less than the peripheral speed $S_2$ at which the stretching rolls 12 of roll set 8 are driven. Thus, the film 2 is stretched to a length $L_1$ between roll sets 6 and 8 at region 14 which is greater than the initial length of the nonporous annealed precursor film being unwound from supply roll 4.

The preliminarily cold stretched film (now designated by reference numeral 15) is then transferred via idler roll 16 to stretching roll set 18 within cold stretch zone $CS_2$. Roll set 18 (like the roll sets 6 and 8 described previously) is composed of a nip roll 22 and a triad arrangement of stretching rolls 24. The stretching rolls 24 of roll set 18 are driven at a peripheral speed $S_3$ which is greater than the peripheral speed $S_2$ at which the stretching rolls of roll set 8 are driven. Thus, the film 15 is further cold stretched to a length $L_2$ (which is greater than length $L_1$) between roll sets 8 and 18 at region 26.

The thus cold stretched film (now designated by reference numeral 28) is then passed, via idler roll 29, around roll 30 within the hot stretch zone HS, around idler roll 34 to hot stretch roll 32. Idler rolls 29 and 34 are provided in order to decrease the unsupported film web length during its stretching between roll set 18 and the first driven hot stretch roll 34. In this regard, the hot stretch roll 32 is driven by suitable means (not shown) at a peripheral speed $S_4$ which is greater than the peripheral speed $S_3$ imparted to the film 28 via roll set 18. Thus, stretching of the film 28 to a length $L_3$ greater than length $L_2$ occurs between roll set 18 and the first hot stretch roll 32.

The hot stretching procedure is continued for as many discrete steps as may be preferred. For example, the film web 28 is stretched in hot stretch zone HS between roll 32 and roll 32a, around upper roll 30a, with idler rolls 34a and 34b being interposed therebetween to again decrease the unsupported length of the film. The film is thus guided in a festoon-like arrangement sequentially from one of the lower stretch rolls to the next sequential one of the upper stretch rolls and then from that upper roll to the next sequential one of the lower rolls; for example from roll 32a to roll 30b; from roll 30b to roll 32b; from roll 32b to roll 30c; etcetera. It will be noted that between each set of hot stretch rolls, there are interposed idler rolls 34c-34r—the purpose of which is to decrease the unsupported length of the film 28 during the hot stretching operation. The now microporous film (designated by reference numeral 36) exits the hot stretch zone HS via idler roll 38 and is passed to downstream processing stations (such as, for example, delamination (if more than a single ply of film was stretched), cutting, slitting, winding, packaging and the like).

At least some of the downstream-most rolls within the hot stretching zone HS (e.g., rolls 30f-30h and/or rolls 32f-32h) are preferably driven at peripheral speeds less than their respective sequential upstream roll so as to allow the stretched film to controllably relax. In this regard, the reader's attention is directed to the previously cited U.S. Pat. No. 4,138,459 to Brazinsky et al (the entire disclosure of which is expressly incorporated hereinto by reference) for a more detailed discussion of the heat relaxing steps which may also be employed in the practice of this invention.

It will be noted that the cold stretch zone $CS_1$ is substantially thermally isolated from the cold and hot stretch zones $CS_2$ and HS, respectively via partition wall 40. Thus, a variety of temperature conditions may be caused to exist as between the cold stretch zones $CS_1$ and $CS_2$ (as will be explained in greater detail below). Cold stretch zone $CS_1$ is preferably maintained at ambient (i.e., room) temperature (e.g., about 25° C.) but could optionally be supplied with chilled air so that the cold stretch zone $CS_1$ is operated at a temperature of between −25° C. up to about 20° C. below the melting point of the polymer which comprises the film being stretched.

The cold stretch zone $CS_2$ may also be operated at a temperature of between −25° C. up to about 20° C. below the melting point of the polymer comprising the film being stretched. Preferably, however, the cold stretch zone $CS_2$ is somewhat warmer as compared to the cold stretch zone $CS_1$ (but is nonetheless within the temperature range mentioned above) owing principally to the fact that the cold stretch zone $CS_2$ is located physically within the enclosure 42 defining the hot stretch zone HS.

Hot stretching in the hot stretch zone HS occurs at a temperature preferably in the range of between about 20° C. below the crystalline melting temperature of the polymer which comprises the film to a temperature approximately 5° C. below the crystalline melting point of the polymer. For example, polypropylene film is preferably hot stretched at a hot stretch temperature of between about 130° C. and about 150° C. It should be appreciated that the "hot stretch temperature" and "cold stretch temperature" referred to herein is meant to denote the temperature of the film during hot and cold stretching, respectively.

Any convenient means to elevate the temperature within the hot stretching zone HS (and hence elevate the temperature of the film being stretched therein to its hot stretching temperature) may be employed in the practice of this invention. Thus, suitable heating elements (e.g., electrical resistance elements, radiant energy sources, etcetera) may be employed to heat the environment within the hot stretching zone HS to achieve a predetermined suitable hot stretching temperature for the film. Alternatively, the rolls 30-30i and/or 32-32h may themselves be provided with suitable integral heating elements (e.g., electrical resistance heating elements) and/or supplied with a heated fluid (e.g., steam). In a similar manner, the roll sets 6, 8 and/or 18 in cold stretch zones $CS_1$ and/or $CS_2$ may be chilled by providing them with a suitable chilled fluid (e.g., chilled water) in addition, or as an alternative, to the introduction of chilled air into e.g., zone $CS_1$ as was briefly mentioned above.

It will be observed that the stretching which occurs between roll set 18 (physically located within the enclosure 42 defining both the cold and hot stretch zones $CS_2$ and HS) and the roll set 8 (physically located in cold stretch zone $CS_1$) is not technically a "hot stretching step" since the film 15 has not yet been elevated to its hot stretching temperature (i.e., as was defined above) within the enclosure 42. Rather, the film 15 does not actually achieve a hot stretching temperature until some point downstream of roll set 18—i.e., at some point within the hot stretching zone HS. Thus, the stretching which occurs between the roll sets 8 and 18 constitutes, for purposes of this invention, another discrete cold stretching step, and thus has been designated cold stretching zone $CS_2$.

Surprisingly, it has been discovered that novel microporous membranes are formed having smaller pore sizes and increased pore densities when the total cold stretch extension imparted to the film is greater than 30%, and more advantageously greater than 40% as compared to the initial length of the precursor film. This cold stretching is moreover preferably accomplished in multiple discrete cold stretching steps. In this manner, the combined effect of increasing the total amount of extension imparted to the film during cold stretching, and preferably distributing this increased total cold stretching among a number of discrete cold stretching steps results in a membrane having lesser pore sizes and greater pore densities as compared to microporous membranes of the prior art which were not produced using the cold stretching technique of this invention.

According to this invention, the amount of film stretching which is accomplished for each cold stretching step should be distributed (preferably substantially evenly) among the plural cold stretch steps employed. For example, where two cold stretch steps are employed as is shown in FIG. 1, the film should be stretched in length to an amount greater than about 1.15:1 (i.e., greater than about 15 percent) based upon the film's starting length before such cold stretching step in each of the regions 14 and 26 to thereby achieve a "total" cold stretch of greater than 1.30:1 (i.e., greater than 30%). This stretching will hereinafter be termed the "cold stretch ratio" or "cold extension", and may sometimes be expressed in terms of a percentage of stretch. Thus, in each of the regions 14 and 26, (see FIG. 1), the rolls are driven so as to achieve a total cold stretch ratio of greater than about 1.30:1 (i.e., the film is stretched greater than 30 percent in length as compared to its starting length before such cold stretching steps), and more preferably greater than 1.40:1 (i.e., greater than 40%). On the other hand, if four discrete cold stretch steps are employed, then the total cold stretching is distributed among these four cold stretch steps—for example, with two steps stretching the film to greater than 1.10:1 and the remaining two steps stretching the film to greater than 1.05:1 so as to achieve a "total" cold stretch which is greater than 1.30:1 (and preferably greater than 1.40:1).

Figure 2:
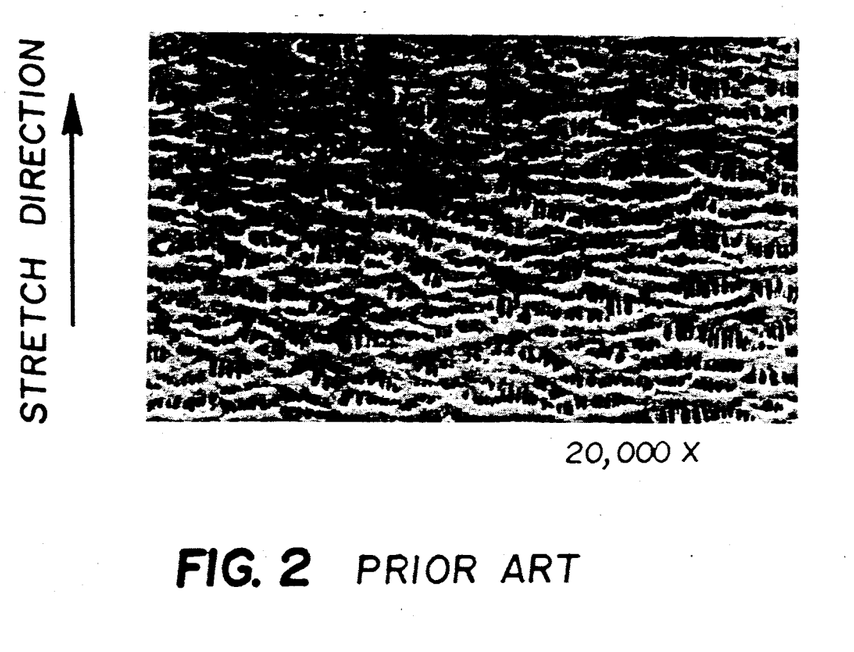
FIG. 2 is a photomicrograph of a conventional microporous membrane taken at 20,000× magnification.

FIG. 2 is a photomicrograph of a prior art microporous polypropylene membrane (Celgard ® 2400 microporous film commercially available from the Separations Products Division, Hoechst Celanese Corporation, Charlotte, N.C.) taken at a magnification of 20,000×. The membrane of FIG. 2 thus shows the classic morphology of membranes produced by uniaxial cold and hot stretching operations. That is, the membrane morphology of FIG. 2 is one which has a plurality of elongated, non-porous interconnecting surface regions which have their axes of elongation substantially parallel to one another and substantially perpendicular to the direction in which the membrane is stretched. Also visible in FIG. 2 are the elongated porous surface regions substantially alternating with and defined by the non-porous surface regions with a number of fibrils interconnecting adjacent non-porous regions in the stretch direction. Between these fibrils are the pores.

Figure 3:
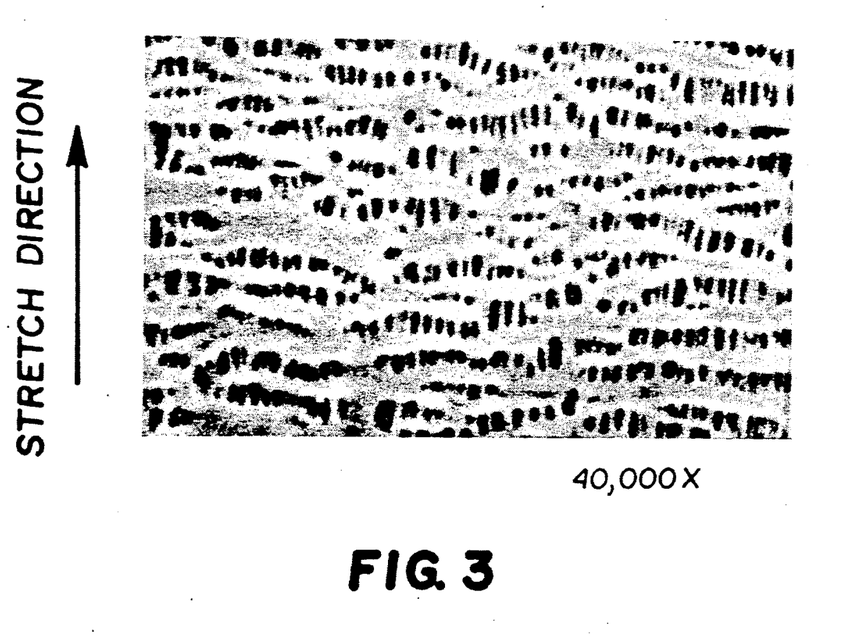
FIG. 3 is a photomicrograph of a microporous membrane of this invention taken at 40,000× magnification.

FIG. 3 is a photomicrograph of a polypropylene microporous membrane according to this invention. As is seen, a very similar pore morphology is present as compared to the prior art membrane of FIG. 2. Significantly however, in order to obtain roughly comparable pore resolution in the photomicrograph, a magnification of 40,000× was required—i.e., twice the magnification of FIG. 2. This indicates qualitatively the decreased pore sizes and increased pore densities of the membranes of this invention as compared to similarly configured membranes of the prior art—i.e., as compared to membranes which were not produced using the cold stretching techniques of this invention.

Figure 4:
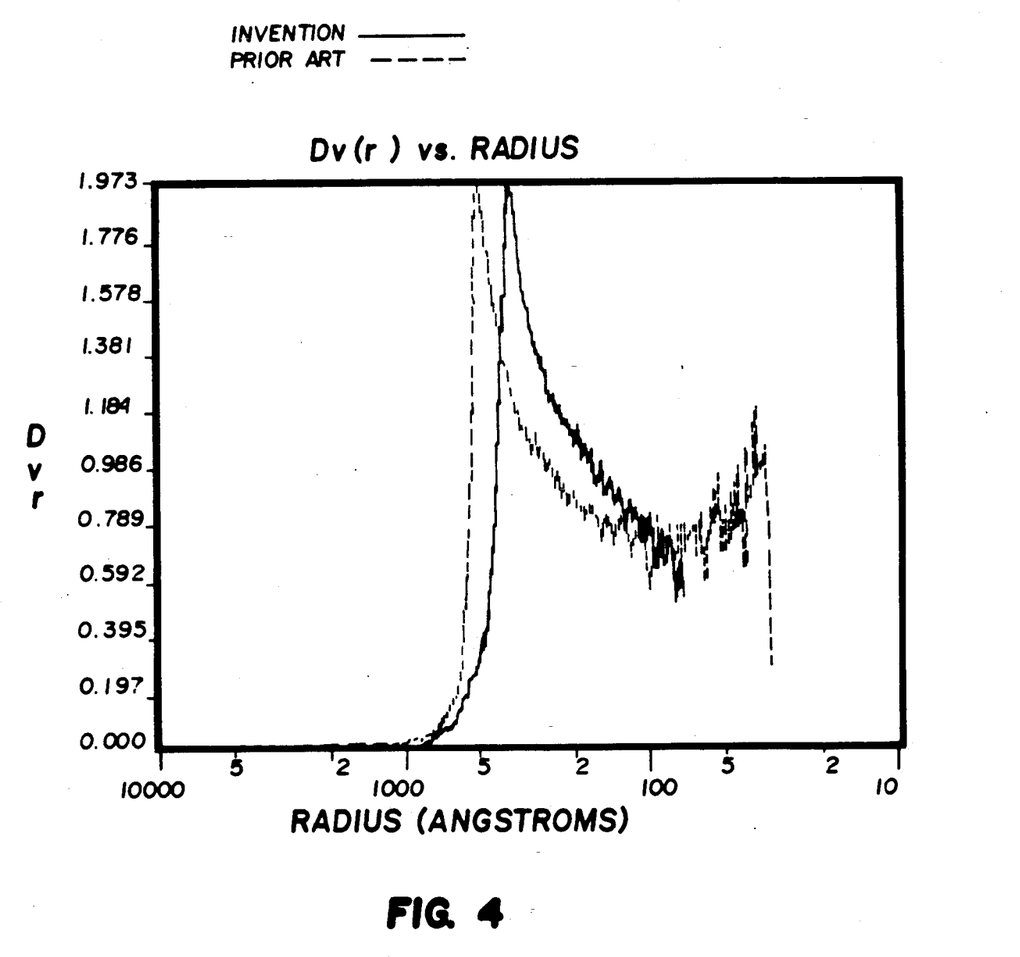
FIGS. 4–6 are mercury porosimetry graphs comparing similar data for a microporous membrane of this invention and a conventional microporous membrane.
Figure 5:
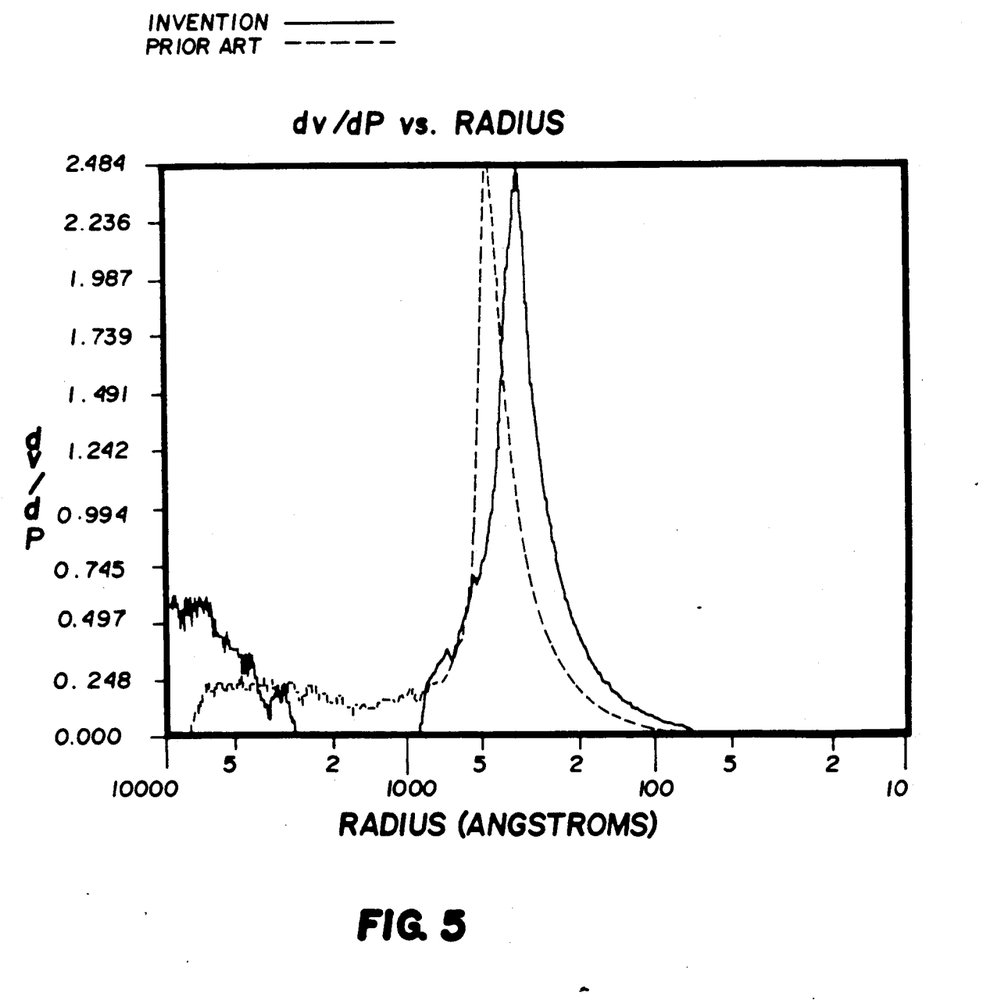
Figure 6:
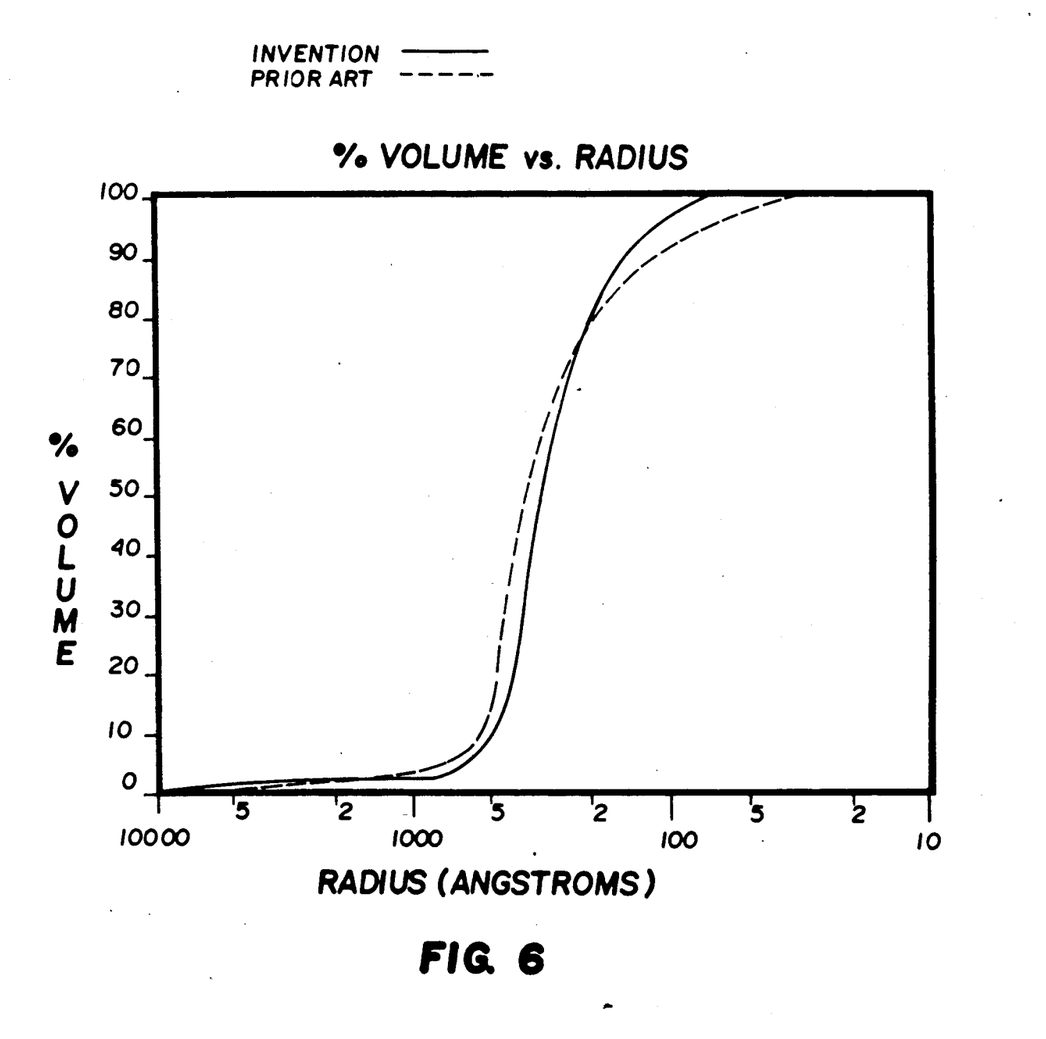

FIGS. 4–6 are graphs obtained using mercury porosimetry analysis and compare a polypropylene microporous membrane according to this invention to a prior art polypropylene microporous membrane (i.e., Celgard ® 2400 microporous film). Interpretation of these graphs shows an average pore size of the membrane of this invention to be about 0.036 micron in radius as compared to an average pore size of about 0.048 micron in radius for the prior art membrane. These data also indicate that, since the area of the pores is proportional to the square of the pore radius, the area of the pores in the membranes of this invention is about 0.56 times the area of the pores in the prior membrane—or, a reduction of pore area of about one-half. Attention is directed to "Application of Mercury Penetration to Materials Analysis", Clyde Orr, Jr., Powder Technology, 3, pgs. 117-123 (1969/70), the entire content of which is expressly incorporated hereinto by reference, for a more detailed discussion of mercury porosimetry analysis.

Further aspects of this invention will become more clear after careful consideration is give to the following non-limiting Examples:

EXAMPLE I

Microporous polypropylene membranes were prepared according to the following stretching conditions using multiple discrete cold stretching steps (e.g., 2) followed sequentially by multiple (e.g., 17) hot stretching steps (some of which were relaxation steps):

| Stretch Zones | % Extension | |
|---|---|---|
| | Sample A | Sample B |
| $CS_1$ | 15.00 | 9.0 |
| $CS_2$ | 20.00 | 15.00 |
| HS | | |
| #1 | 23.00 | 23.00 |
| #2 | 21.00 | 21.00 |
| #3 | 5.00 | 5.00 |
| #4 | 4.00 | 4.00 |
| #5 | 4.00 | 4.00 |
| #6 | 3.00 | 3.00 |
| #7 | 3.00 | 3.00 |
| #8 | 3.00 | 3.00 |
| #9 | 2.00 | 2.00 |
| #10 | 2.00 | 2.00 |
| #11 | 0.00 | 0.00 |
| #12 | 0.00 | 0.00 |
| #13 | −3.19 | −3.19 |
| #14 | −3.30 | −3.30 |
| #15 | −3.41 | −3.41 |
| #16 | −3.53 | −3.53 |
| #17 | −3.66 | −3.66 |

As is seen, Sample A was subjected to a greater total cold stretch as compared to that employed in Sample B (i.e., 35% for Sample A as compared to 24% for Sample B). In addition, each of the cold stretching steps employed in the production of Sample A was 15% or greater whereas the cold stretching employed in the production of Sample B in $CS_1$ was significantly less than 15% (i.e., 9.00%) even though the stretching employed in $CS_2$ was 15%. The temperature of $CS_1$ in Sample A was 55° C. to 70° C. whereas the temperature of $CS_1$ in Sample B was 25° C. to 30° C. (i.e., room temperature). The membrane of Sample A showed a distinctive "bluish" color hue characteristic of the membranes of this invention, while the membrane of Sample B did not exhibit a "bluish hue" but rather was opaque and white.

Permeability measurements of Samples A and B showed that Sample A exhibited Gurley Values of between 16–22 Seconds, whereas Sample B exhibited Gurley Values of 29–35. Thus, significantly better permeabilities are achieved with the membranes of this invention, it being remembered that the lesser the Gurley Value, the greater the ease of mass transfer across the membrane, and hence the better the permeability for the membrane.

EXAMPLE II

Microporous polypropylene membrane films were produced using the following cold stretching steps:

| | % Extension | | |
|---|---|---|---|
| | Sample C | Sample D | Sample E (comparative) |
| $CS_1$ | 15 | 25 | 18 |
| $CS_2$ | 15 | 25 | 6 |
| Total stretch | 150 | 150 | 138 |
| Net stretch | 100 | 100 | 100 |

The membrane films exhibited the following properties:

| | Sample C | Sample D | Sample E (comparative) |
|---|---|---|---|
| Image Analysis of scanning electronic microscope photos | | | |

-continued

|  | Sample C | Sample D | Sample E (comparative) |
| --- | --- | --- | --- |
| Avg. pore length (micron) | .09 | .05 | 0.11–0.13 |
| Avg. pore breadth (micron) | .035 | .024 | .033–.038 |
| Avg. pore surface area (micron$^2$)($\times 10^{-3}$) | 2.4 | 0.9 | 2.8 to 4.1 |
| Mercury Porosimetry | | | |
| Avg. pore radius (micron) | .0383 | .0365 | .0540 |
| BET Analysis | | | |
| Specific Surface Area (m$^2$/g) | — | 49.5 | 38.9 |

As is apparent from the foregoing, Samples C and D according to this invention (i.e., since the total cold stretch being greater than 30%), exhibited pore sizes which are significantly less as compared to the pore sizes of comparative Sample E not in accordance with this invention (i.e., since the total cold stretch was less than 35%). Also, it will be noted that the specific surface area of Sample D according to this invention is significantly greater than the specific surface area of Comparative Example E indicating that the membranes of this invention also had increased pore densities.

EXAMPLE III

The microporous membrane Samples C, D and E were tested for coloration (b* value) using a Macbeth Coloreye TM apparatus wherein a single ply of each microporous membrane was tested against a black background so as to more closely simulate light transmissive qualities. The results appear below:

| Sample | b* Value |
| --- | --- |
| C | −11.48 |
| D | −14.02 |
| E | −7.00 |

It will be noted that each of the membranes of this invention have b* values of less than −10 thereby indicating greater coloration (i.e., indicative of the "bluish hue") as compared to the prior art membrane of comparative Sample E.

EXAMPLE IV

The pore density of Samples C and D according to this invention were qualitatively determined and appear below in comparison to pore densities of a prior art Celgard ® 2400 microporous polypropylene film.

|  | Pore Density (# of pores/square micron) |
| --- | --- |
| Sample C | 75 |
| Sample D | 105 |
| Celgard ® 2400 | 35–54 |

The above data demonstrate that the membranes of this invention exhibit pore densities about twice that of a conventional microporous polypropylene membrane.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for preparing an open-celled, microporous polymer membrane which comprises the steps of:
   (a) uniaxially cold stretching a non-porous crystalline polymeric precursor to said membrane at a temperature in the range of between about −20° C. to about 20° C. below the crystalline melting point of the polymeric precursor, said uniaxial cold stretching being such that said polymeric precursor is extended greater than about 30% in length as compared to the initial length of said polymeric precursor; and
   (b) uniaxially hot stretching in the same direction the cold stretched precursor achieved in the practice of step (a) at a temperature in the range of between about 20° C. below the crystalline melting point of the polymeric precursor to about 5° C. below the crystalline melting point of the polymeric precursor whereby to achieve a microporous polymer membrane having an open-celled structure consisting of a dense plurality of interconnected pores and characterized by having a reduced bulk density as compared to the bulk density of a corresponding nonopen-celled structure, and having a pore density of greater than about 75 pores per square micron of membrane surface area, and wherein the pores have an average length of less than about 0.10 micron, an average breadth of less than about 0.035 micron, and an average surface area of less than about $2.5 \times 10^{-3}$ square micron.

2. The process of claim 1 in which
   said step (a) is practiced by subjecting the polymeric precursor to a number of discrete cold stretching steps prior to said hot stretching according to step (b).

3. A process as in claim 2, wherein step (a) is practiced so as to achieve a total cold stretch ratio of greater than about 1.30:1.

4. A process as in claim 3, wherein said cold stretch ratio is achieved by distributing the cold stretching ratio substantially evenly among said discrete cold stretching steps.

5. A process as in claim 2, wherein the total amount of extension accomplished by the said discrete cold stretching steps is greater than about 40% based upon the starting length of the said polymeric precursor before cold stretching.

6. A microporous membrane produced by the process of claim 1 or 2.

7. A microporous membrane as in claim 6 further characterized by having a permeability of less than about 22 Gurley seconds.

8. A microporous membrane as in claim 7, which has a permeability of between about 16 to about 22 Gurley seconds.

9. A process as in claim 1, wherein said polymeric precursor is formed of a polyolefin.

10. A process as in claim 9, wherein said polyolefin is polypropylene.

11. A process as in claim 1, wherein said polymeric precursor is in the form of a film.

12. A process as in claim 1, wherein said polymeric precursor is in the form of a hollow fiber.

13. A process as in claim 1, which further comprises, prior to step (a), the step of heat annealing the polymeric precursor.

14. A microporous membrane according to claim 1 consisting essentially of polyolefin and having an average pore radius as determined by mercury porosimetry of less than about 0.040 micron, and a MacBeth Coloreye $b^*$ value of less than about $-10$ as determined by placing a single ply sample of the membrane against a black background.

* * * * *